(12) United States Patent  
Hernandez-Abrego (10) Patent No.: US 8,818,813 B2  
(45) Date of Patent: *Aug. 26, 2014

(54) METHODS AND SYSTEM FOR GRAMMAR FITNESS EVALUATION AS SPEECH RECOGNITION ERROR PREDICTOR

(71) Applicant: Sony Computer Entertainment Inc., Tokyo (JP)

(72) Inventor: Gustavo A. Hernandez-Abrego, Mountain View, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/046,765

(22) Filed: Oct. 4, 2013

(65) Prior Publication Data

US 2014/0039896 A1 Feb. 6, 2014

Related U.S. Application Data

(63) Continuation of application No. 12/780,818, filed on May 14, 2010, now Pat. No. 8,560,318.

(51) Int. Cl.
- *G10L 15/18* (2013.01)
- *G10L 15/19* (2013.01)
- *G10L 15/187* (2013.01)

(52) U.S. Cl.
CPC .............. *G10L 15/19* (2013.01); *G10L 15/187* (2013.01)
USPC ........................................................ 704/257

(58) Field of Classification Search
CPC ........ G10L 15/08; G10L 15/18; G10L 15/187
USPC .......................................................... 704/254
See application file for complete search history.

(56) References Cited

U.S. PATENT DOCUMENTS

| 5,477,451 | A  | * | 12/1995 | Brown et al. ...................... 704/9 |
| 5,579,436 | A  | * | 11/1996 | Chou et al. ...................... 704/244 |
| 6,070,140 | A  | * | 5/2000  | Tran ............................. 704/275 |
| 6,182,039 | B1 | * | 1/2001  | Rigazio et al. ................ 704/257 |

(Continued)

FOREIGN PATENT DOCUMENTS

| JP | H 09-138695   | 5/1997 |
| JP | 2005-227686   | 8/2005 |
| JP | 2009-198646   | 9/2009 |

*Primary Examiner* — Michael N Opsasnick  
(74) *Attorney, Agent, or Firm* — Martine Penilla Group, LLP (57) ABSTRACT

A plurality of statements are received from within a grammar structure. Each of the statements is formed by a number of word sets. A number of alignment regions across the statements are identified by aligning the statements on a word set basis. Each aligned word set represents an alignment region. A number of potential confusion zones are identified across the statements. Each potential confusion zone is defined by words from two or more of the statements at corresponding positions outside the alignment regions. For each of the identified potential confusion zones, phonetic pronunciations of the words within the potential confusion zone are analyzed to determine a measure of confusion probability between the words when audibly processed by a speech recognition system during the computing event. An identity of the potential confusion zones across the statements and their corresponding measure of confusion probability are reported to facilitate grammar structure improvement.

20 Claims, 8 Drawing Sheets

(56) References Cited

U.S. PATENT DOCUMENTS

| | | | |
|---|---|---|---|
| 6,240,389 B1* | 5/2001 | Keiller et al. | 704/243 |
| 6,725,196 B2* | 4/2004 | Keiller et al. | 704/242 |
| 6,964,023 B2* | 11/2005 | Maes et al. | 715/811 |
| 7,092,883 B1* | 8/2006 | Gretter et al. | 704/242 |
| 7,472,061 B1* | 12/2008 | Alewine et al. | 704/243 |
| 7,562,010 B1* | 7/2009 | Gretter et al. | 704/9 |
| 7,957,969 B2* | 6/2011 | Alewine et al. | 704/254 |
| 2004/0193408 A1* | 9/2004 | Hunt | 704/209 |

\* cited by examiner

```

# Example Input Text File

# This is a comment line

I Rock and Roll
We Rock and Roll
You Rock and Roll
I Have fun
We Have fun
You Have fun
I Look good
We Look good
You Look good
I Like to Play
We Like to Play
You Like to Play
I Like to Talk
We Like to Talk
You Like to Talk
I Like to Swim
We Like to Swim
You Like to Swim
I Like to Dress Up
We Like to Dress Up
You Like to Dress Up
I Love to Play
We Love to Play
You Love to Play
I Love to Talk
We Love to Talk
You Love to Talk
I Love to Swim
We Love to Swim
You Love to Swim
I Love to Dress Up
We Love to Dress Up
You Love to Dress Up
I Enjoy Dancing
We Enjoy Dancing
You Enjoy Dancing
I Enjoy Music
We Enjoy Music
You Enjoy Music
```

Fig. 1A

```

# Showing how to use comments, alternatives, and variables

# This is a comment line
# Variables have a '$' sign
$me = I
# Alternatives can be defined in a variable
$whatido = (Play)|(Talk)|(Swim)
# Every word or variable in the alternative is in parentheses
$who = ($me)|(We)|(You)
$ Compound words can be used in parentheses
$fun = (Rock and Roll)|(Have fun)|(Look good)
# A mix of alternatives and plain words can be put in variables
$liketo = (Like)|(Love) to
# More complex variables are composed of words and variables
$do = ($fun)|($liketo ($whatido)|(Dress up))
# A sentence does not have a variable definition
# Alternatives can be defined in a sentence also
$who (do)|(Enjoy (Dancing)|(Music))
```

Fig. 1B

```
;---------------------------------------------------------------
!$LANGUAGE!$      ENGLISH//EN
!$SILENCE!$       [sil]
!$GARBAGE!$       sil aa iy uw eh ax hh n d s
;---------------------------------------------------------------
;---------------------------------------------------------------
!$group_2
;---------------------------------------------------------------
"I"          ay
"We"         w iy
"You"        y uw
;---------------------------------------------------------------
!$group_9
;---------------------------------------------------------------
"Swim"       s w ih m
"Talk"       t ao k
"Play"       p l ey
"Dress up"   d r eh s ___ ah p
;---------------------------------------------------------------
!$group_12
;---------------------------------------------------------------
"Dancing"    d ae n s ih n
"Music"      m ah s ih k
;---------------------------------------------------------------
!$group_5
;---------------------------------------------------------------
"Look good"      l uw k ___ g uh d
"Have fun"       hh ae v ___ f ah n
"Rock and Roll"  r ao k ___ ae n d ___ r ow l
;---------------------------------------------------------------
!$group_11
;---------------------------------------------------------------
"Like to"    l ay k ___ t uw
;---------------------------------------------------------------
!$group_16
;---------------------------------------------------------------
"Enjoy"      ax n jh oy
;---------------------------------------------------------------
!$group_7
;---------------------------------------------------------------
"Love to"    l ah v ___ t uw
;---------------------------------------------------------------
;---------------------------------------------------------------
!$SENTENCE!$
;---------------------------------------------------------------
                ==> $group_2
"$group_7"      ==> $group_9
"$group_11"     ==> $group_9
"$group_16"     ==> $group_12
"$group_2"      ==> $group_5
"$group_2"      ==> $group_11
"$group_2"      ==> $group_16
"$group_2"      ==> $group_7
```

```
GRAMMAR FITNESS REPORT

Phonetic accuracy threshold = 25.00

'Like to' and 'Love to' are 47.65 close
Context example:
_BEGIN_ You Like to Dress up _END_
_BEGIN_ You Love to Dress up _END_

'We Like to' and 'I Love to' are 29.87 close
Context example:
_BEGIN_ We Like to Dress up _END_
_BEGIN_ I Love to Dress up _END_

'You Like to' and 'We Love to' are 28.99 close
Context example:
_BEGIN_ You Like to Dress up _END_
_BEGIN_ We Love to Dress up _END_

'You Like to' and 'I Love to' are 28.99 close
Context example:
_BEGIN_ You Like to Dress up _END_
_BEGIN_ I Love to Dress up _END_

'We Like to' and 'You Love to' are 28.99 close
Context example:
_BEGIN_ We Like to Dress up _END_
_BEGIN_ You Love to Dress up _END_

'Dancing' and 'Music' are 25.81 close
Context example:
_BEGIN_ You Enjoy Dancing _END_
_BEGIN_ You Enjoy Music _END_
```

METHODS AND SYSTEM FOR GRAMMAR FITNESS EVALUATION AS SPEECH RECOGNITION ERROR PREDICTOR

CLAIM OF PRIORITY

This application is a continuation application under 35 U.S.C. 120 of prior U.S. patent application Ser. No. 12/780,818, filed May 14, 2010, issued as U.S. Pat. No. 8,560,318, on Oct. 15, 2013, which is incorporated herein by reference in its entirety.

BACKGROUND

1. Field of the Invention

The present invention relates generally to the method of speech recognition systems, and more particularly, to methods and systems for evaluating fitness of a grammar to be used in a speech recognition system.

2. Description of the Related Art

Implementing robust and effective techniques for system users to interface with electronic devices is a significant consideration of system designers and manufacturers. Voice-controlled operation of electronic devices may often provide a desirable interface for system users to control and interact with electronic devices. For example, voice-controlled operation of an electronic device may allow a user to perform other tasks simultaneously, or can be advantageous in certain types of operating environments. In addition, hands-free operation of electronic devices may also be desirable for users who have physical limitations or other special requirements.

Hands-free operation of electronic devices may be implemented by various speech-activated electronic devices. Speech-activated electronic devices advantageously allow users to interface with electronic devices in situations where it would be inconvenient or potentially hazardous to utilize a traditional input device. However, effectively implementing speech recognition systems creates substantial challenges for system designers.

In the field of speech recognition systems a speech recognition system inputs an audio stream that is filtered to extract and isolate sound segments that are speech. The speech recognition engine then analyzes the speech sound segments by comparing them to a defined pronunciation dictionary, grammar recognition network and an acoustic model.

Sub-lexical speech recognition systems are usually equipped with a way to compose words and sentences from more fundamental units that model the speech waveforms. For example, in a speech recognition system based on phoneme models, pronunciation dictionaries can be used as lookup tables to build words from their phonetic transcriptions. Also, explicit rules for word combination are given to build sentences from words. The rules for sentence construction is regarded as "recognition grammar."

The complexity of the recognition grammar depends on the nature of the application that is to be recognized. For instance, some simple command-like applications will require isolated-word grammars while some dialog-like applications will require more complex sentence construction. Regardless the complexity of the application, the application developer needs to carefully specify the grammar and needs to refine the grammar in order to assure completeness (i.e., that the grammar covers all the sentences required for the application) and to avoid over-generation (i.e., to ensure that the grammar does not allow for generation of unexpected sentences that are not understood by the application). This can be particularly time-consuming, even for the more experienced application developer.

Regardless the amount of effort that the developer dedicates to building the grammar, it is likely that the grammar will include several areas in which the speech recognition system may produce errors. This is because different words with different meanings, and associated to different actions, are acoustically similar, or because a particular combination of words is very close to another word combination that represents a different meaning or action. This makes it difficult for the speech recognition system to differentiate between words, thereby triggering recognition errors.

Thus, the application developer is tasked with considering potential sources of confusion with the grammar and trying to eliminate the potential sources of confusion by attempting to avoid placement of confusable words in interchangeable locations of the grammar. However, this can be particularly challenging when the set of possible word combinations within the grammar is too long for the developer to manually explore with sufficient detail and accuracy. Therefore, it is desirable to have a systematic way to automatically evaluate a grammar to identify placement of confusable words in interchangeable locations within the grammar.

SUMMARY

In one embodiment, a computer implemented method is disclosed for evaluating potential confusion within a grammar structure for a set of statements to be used in speech recognition during a computing event. The method includes an operation for receiving a plurality of statements from within a grammar structure. Each of the plurality of statements is formed by a number of word sets. The method also includes an operation for identifying a number of alignment regions across the plurality of statements by aligning the plurality of statements on a word set basis. Each aligned word set represents an alignment region. The method further includes an operation for identifying a number of potential confusion zones across the plurality of statements. Each potential confusion zone is defined by words from two or more of the plurality of statements at corresponding positions outside the number of alignment regions. For each of the identified potential confusion zones, an operation is performed to analyze phonetic pronunciations of the words within the potential confusion zone to determine a measure of confusion probability between the words when audibly processed by a speech recognition system during the computing event. The method also includes an operation for generating a report to convey an identity of the potential confusion zones across the plurality of statements and their corresponding measure of confusion probability.

In another embodiment, a system is disclosed for evaluating potential confusion within a grammar structure for a set of statements to be used in speech recognition during a computing event. The system includes an input module defined to receive a plurality of statements from within a grammar structure. Each of the plurality of statements is formed by a number of word sets. The system also includes a word-level alignment module defined to identify a number of alignment regions across the plurality of statements received by the input module. An alignment region corresponds to identical word sets aligned across the plurality of statements. The system further includes a confusion zone identification module defined to identify a number of potential confusion zones across the plurality of statements. Each potential confusion zone is defined by words from two or more of the plurality of statements at corresponding positions outside the number of alignment regions identified by the word-level alignment module. The system also includes a confusion probability analysis module defined to analyze phonetic pronunciations of the words within a given potential confusion zone identified by the confusion zone identification module. The analysis of the phonetic pronunciations of the words provides for determination of a measure of confusion probability between the words within the given potential confusion zone when audibly processed by a speech recognition system during the computing event.

In another embodiment, a computer readable medium is disclosed to include program instructions for evaluating potential confusion within a grammar structure for a set of statements to be used in speech recognition during a computing event. Program instructions are provided for receiving a plurality of statements from within a grammar structure. Each of the plurality of statements is formed by a number of word sets. Program instructions are also provided for identifying a number of alignment regions across the plurality of statements by aligning the plurality of statements on a word set basis. Each aligned word set represents an alignment region. Program instructions are also provided for identifying a number of potential confusion zones across the plurality of statements. Each potential confusion zone is defined by words from two or more of the plurality of statements at corresponding positions outside the number of alignment regions. Program instructions are also provided for analyzing phonetic pronunciations of the words within each potential confusion zone to determine a measure of confusion probability between the words within each potential confusion zone, when audibly processed by a speech recognition system during the computing event.

Other aspects of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

In one embodiment, the methods and systems disclosed herein are implemented within a Sony PlayStation® Voice Response (PSVR) tool. The PSVR tool is defined to allow application, i.e., computer program, developers to process audible speech input during application execution into a format that can be recognized and acted upon in real-time by the application. However, it should be understood that in other embodiments the method and systems disclosed herein can be implemented in contexts outside of the PSVR tool. Therefore, the methods and systems disclosed herein are not to be construed as limited to use within the PSVR tool.

Voice recognition is the process of having a person speak to a computer and having the computer recognize what is said. Voice response software can be defined to provide constant information about the process during voice recognition, enabling an application to use the information to give its user real-time feedback or displays, such as an animated talking face or a visual indicator of the user's speech. Voice recognition can be simplified by specifying a limited vocabulary, i.e., dictionary, and grammar for an application. The grammar is a collection of valid combinations of vocabulary words. Said differently, the grammar is a set of valid statements (text sentences/phrases) for an application. The grammar can be defined in a grammar-and-dictionary (GnD) file that includes a representation of an application's vocabulary including words and their pronunciations, and linkage between the words to form the set of valid statements for the application. The possible paths through the valid vocabulary in a GnD file is referred to as a grammar network.

Figure 1A:
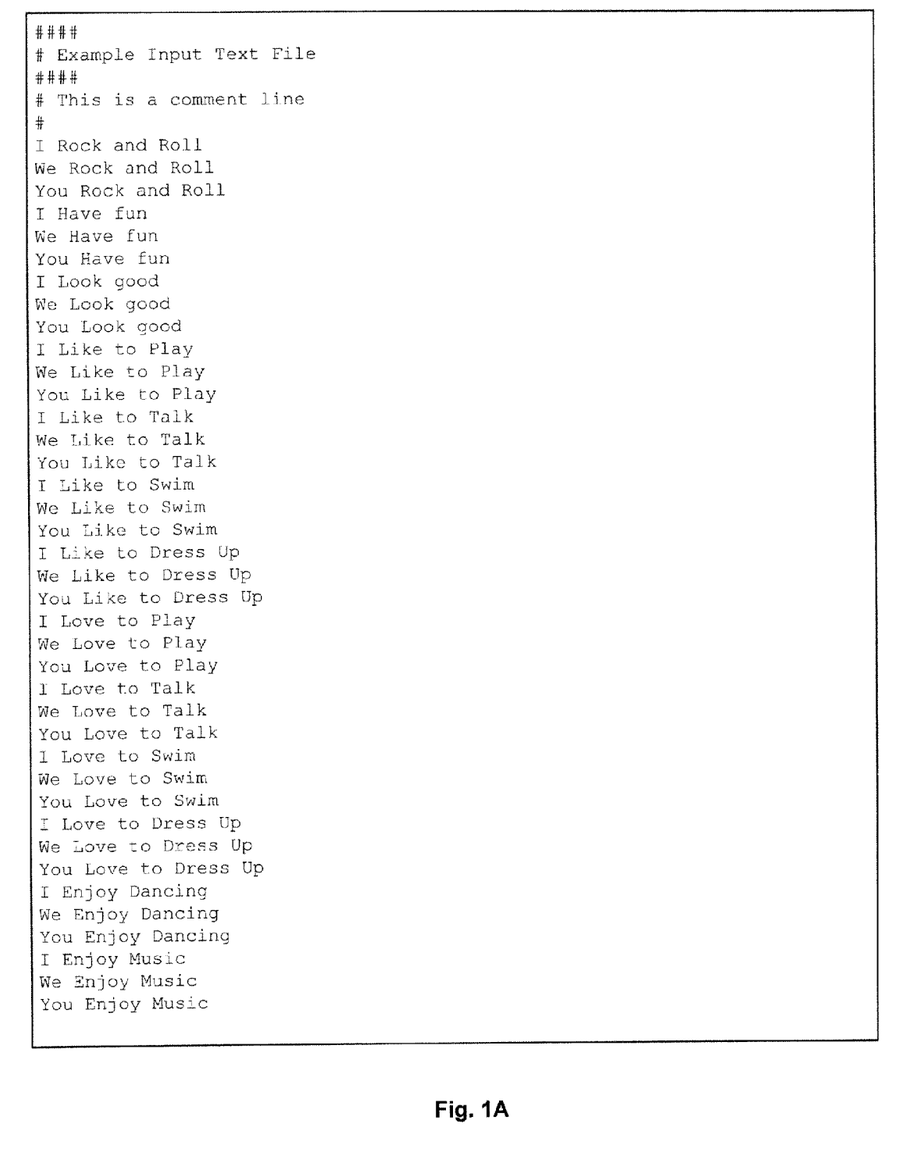
FIG. 1A shows an example of an input text file, in accordance with one embodiment of the present invention.
Figure 1B:
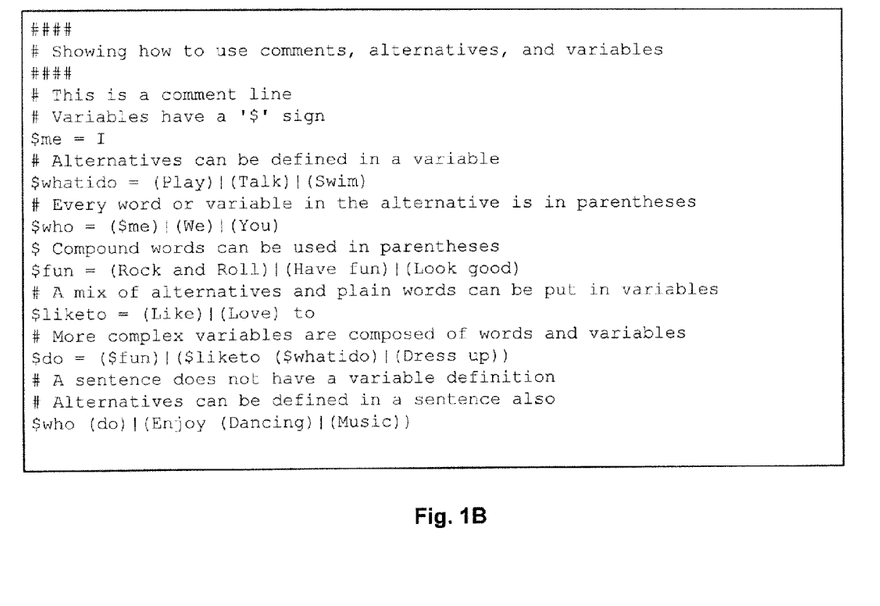
FIG. 1B shows the input text file of FIG. 1A defined using alternative and variable representations to specify the statements, in accordance with one embodiment of the present invention.

In one embodiment, a speech recognition system, such as PSVR, can receive as input a text file specifying the valid statements to be used with an application. This input text file may be created by the application developer based on statements which need to be recognized by the speech recognition system in order for the application to appropriately respond. FIG. 1A shows an example of an input text file, in accordance with one embodiment of the present invention. As shown in FIG. 1A, the input text file can include a simple listing of statements. Alternatively, the input text file can utilize alternative and variable representations to specify the statements. In one embodiment, alternative words/phrases can be delineated by a symbol such as "|" within the input text file. Also, in one embodiment, variable labels can be used to represent words/phrases within the input text file. For example, a notation $ {variable label}={words/phrases} can be used to assign words/phrases to a variable label. Also, in one embodiment, the input text file can utilize parenthetical notation for associative grouping of words/phrases. FIG. 1B shows the input text file of FIG. 1A defined using alternative and variable representations to specify the statements, in accordance with one embodiment of the present invention.

Figure 2:
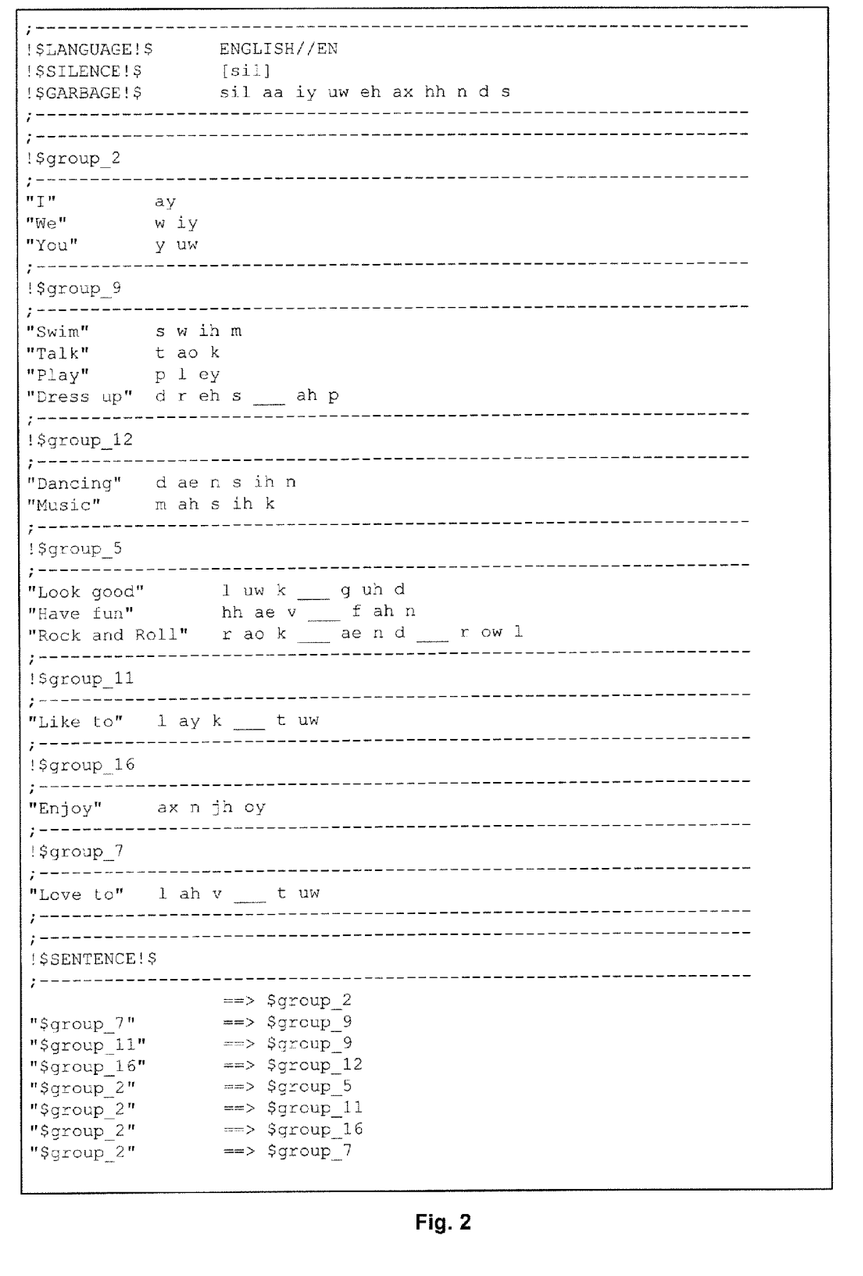
FIG. 2 shows a GnD file corresponding to the input text file of FIGS. 1A and 1B, in accordance with one embodiment of the present invention.
Figure 3:
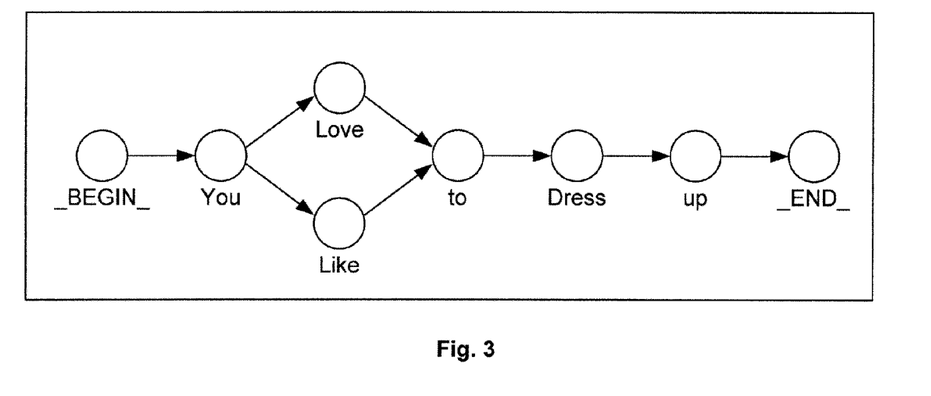
FIG. 3 shows a path network through the grammar for two of the statements defined in the GnD file of FIG. 2, in accordance with one embodiment of the present invention.

FIG. 2 shows a GnD file corresponding to the input text file of FIGS. 1A and 1B, in accordance with one embodiment of the present invention. The GnD file defines the grammar for the statements in the input text file. The GnD file includes the word sets in the grammar, the pronunciations of the word sets, and the linkage of the word sets to form valid statements. In the example of FIG. 2, each word set is enclosed in quotes (" "). The words sets are collected into groups and linkages between the groups are specified (by the ==> symbol) to define the possible statements. The links between the groups define the possible paths through the grammar in the GnD file. For example, FIG. 3 shows a path network through the grammar for two of the statements defined in the GnD file of FIG. 2, in accordance with one embodiment of the present invention.

During the voice recognition process, the grammar and the dictionary work in combination to provide a grammar network. The speech recognition tool traverses this grammar network during the recognition process. The speech recognition process becomes more difficult and/or inaccurate as the grammar network becomes more complex and/or confusing. It is desirable to reduce or eliminate confusion with the grammar network of the GnD file to a largest possible extent to ensure proper speech recognition results during application execution. To do this, it is necessary to identify potentially confusing portions of the grammar within the GnD file. Identification and measurement of potentially confusing portions of the grammar is referred to as a grammar fitness evaluation or grammar quality evaluation.

In automatic speech recognition, a recognition hypothesis is the result of a set of scores that are accumulated as the acoustic signal traverses the paths allowed by the grammar or language model. In sub-lexical speech recognition (speech recognition based on units shorter than words, e.g., phonemes), these paths allowed by the grammar are built by the phonetic sequences that represent words and sentences. A set of paths that are very "close" will be more confusable than a set of paths with clear and sharp differences between them. The paths depicted in FIG. 3 show an example of close paths through a grammar. More specifically, the two paths of FIG. 3 are separated by a single word difference, where the words that compose the difference between the paths have similar phonemes, i.e., similar phonetic sounds.

The closeness of one path to another path within a grammar can vary depending on the quantity, position, and magnitude of phonetic differences between the paths. That is to say, a recognition distance between paths within a grammar is a function of the way the paths are composed and the acoustic similarity between the components of each path. By measuring the recognition distance between paths within a grammar, it is possible to make an estimate of the "closeness" between phonetic sequences that might conflict with each other and provoke speech recognition errors. The grammar fitness evaluation is a recognition distance evaluation for all the statements (and the underlying phonetic paths) within a grammar of an application. This grammar fitness evaluation can be part of a feedback mechanism in a grammar design process for an application, aimed to reduce an amount and frequency of occurrence of speech recognition errors during execution of the application.

Figure 4:
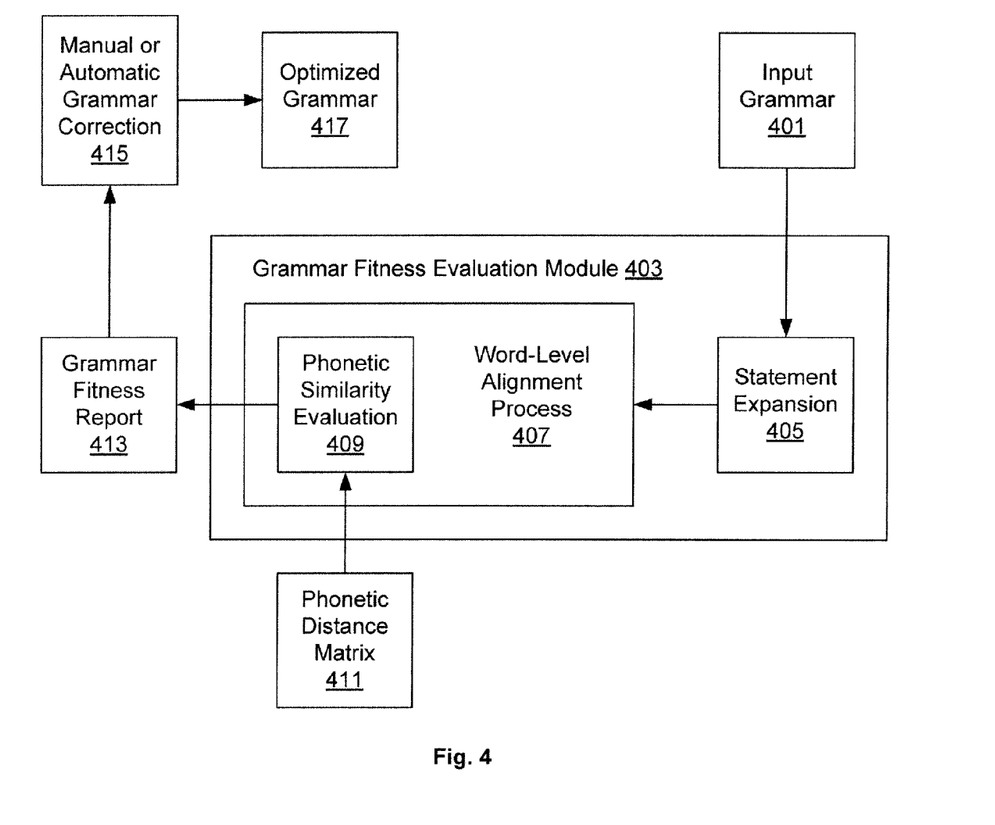
FIG. 4 shows an operational diagram of a grammar fitness evaluation (GFE) process, in accordance with one embodiment of the present invention.

FIG. 4 shows an operational diagram of a grammar fitness evaluation (GFE) process, in accordance with one embodiment of the present invention. In the GFE process, an input grammar 401 is generated and provided as an input to a GFE module 403. In one embodiment, the input grammar 401 is provided in the form of a GnD file, such as that exemplified in FIG. 2. In other embodiments, the input grammar 401 can be provided in other formats, so long as the format of the input grammar 401 is understood by the GFE module 403, and so long as the input grammar 401 specifies valid combinations of words/word sets to form statements that are intended to be recognized by a speech recognition system, such as the PSVR system.

Upon receipt of the input grammar 401 by the GFE module 403, a statement expansion process 405 is performed to extract all valid statements from the input grammar 401. In other words, the statement expansion process 405 explicitly generates all statements allowed by the input grammar 401. By definition, a grammar is a synthetic representation of the set of statements that are valid to a given application. The statement expansion process 405 is performed to enable analysis of the composition of each statement and to enable estimation of the recognition distances between the statements. It should be understood that input grammar 401 is completely expanded into its valid statement set to avoid overlooking potential confusion that may occur between words or statements that are seemingly different, but phonetically similar when considered in their full context. The valid statement set resulting from the statement expansion process 405 is the basis for the subsequent GFE.

The words in a statement can be transformed into phonetic sequences by substituting each word with its corresponding pronunciation from the dictionary of the input grammar 401. Some words might have more than one pronunciation. Therefore, one single word statement can produce a number of phonetic sequences. Depending on the nature and the number of pronunciations of the words in a given statement, the operation of substituting each word with its corresponding pronunciation may produce multiple phonetic sequences. It should be noted that phonetic sequences of the statements are the same phonetic sequences that an automatic speech recognizer would use to compare with the voice input in order to discern the phonemes included in the voice signal.

In the case where multiple phonetic sequences are available for one or more words in a statement, the multiple phonetic sequences can be organized in tree structures. In one embodiment, a tree structure can also be used to provide more structure to the exploring of the different phonetic sequences, but for the sake of simplicity and clarity, the description herein assumes that all the phonetic sequences are explicitly represented. Therefore, in the statement expansion process 403, multiple instances of a given statement may result when one or more words in the given statement has more than one pronunciation, with each instance of the given statement corresponding to a unique phonetic pronunciation of the given statement.

In the GFE, it may not be sufficient to determine which sentences are likely to be confused. It may also be necessary to determine the reasons for such confusion, and if actions are going to be taken to avoid the confusion, where those actions should be applied. To this end, the GFE includes a word-level alignment process 407 and a phonetic similarity evaluation 409. The word-level alignment process 407 is performed on the valid statement set resulting from the statement expansion process 405. The word-level alignment process 407 identifies potentially confusable statements in the input grammar 401. The phonetic similarity evaluation 409 identifies sources of potential confusion within the potentially confusable statements identified by the word-level alignment process 407.

Therefore, the word-level alignment process 407 can be viewed as a confusion detection operation, and the phonetic similarity evaluation 409 can be viewed as a zooming operation into the confusable regions illuminated by the confusion detection operation. In following, FIG. 4 shows the phonetic similarity evaluation 409 as dependent upon, i.e., graphically disposed within, the word-level alignment process 407. It should be appreciated that implementation of the word-level alignment process 407 as a focus mechanism for the subsequent phonetic similarity evaluation 409, reduces the computation burden of comparing a large number of phonetic sequences across an entirety of the statements, where each statement can include many phonemes.

The word-level alignment process 407 includes comparison of each statement extracted from the input grammar 401 against all other statements extracted from the input grammar 401. The word-level alignment process 407 compares two different sequences of symbols, i.e., two different statements, and matches them according to some pre-defined distance measure. In one embodiment, the symbols that are compared correspond to word sets within the compared statements. In one embodiment, the word sets used for comparison of the statements are the word sets as defined in the groupings within the input grammar 401. It should be understood that a word set in this case can include one or more words. When a word set includes multiple words, the multiple words consistently appear together within the input grammar 401.

In one embodiment, the word-level alignment process 407 is implemented as a dynamic programming procedure. In this embodiment, the word-level alignment process 407 is driven by a cost of replacing one symbol, i.e., word set, of one statement with a symbol, i.e., word set, from the another statement. Depending on the construction of the statements, there may be multiple ways to align word sets (symbols) across two or more statements. In one embodiment, the word-level alignment process 407 determines an "optimal" alignment of statements, where the optimal alignment of statements corresponds to the lowest total replacement cost in aligning the statements.

In one embodiment, the word-level alignment process 407 is performed over all the statements in the input grammar 401, two statements at a time. Performance of the word-level alignment process 407 on a given pair of statements will produce an alignment sequence for the given pair of statements. The alignment sequence combines the elements (word sets) of both statements under consideration, and reports the kind of match found between the elements of the statements. The alignment sequence is characterized in units of HIT (matching element), SUBS (substitution of element), INS (insertion of element), and DEL (deletion of element). Again, in the word-level alignment process 407, only the word-level alignment sequence is considered. The word-level alignment sequence shows the areas in which word sets in both sentences are the same or different.

The word-level alignment process 407 and resulting word-level alignment sequence is illustrated by the following example:

First statement: _BEGIN_ You Like to Dress up _END_
Second statement: _BEGIN_ You Love to Dress up _END_
Resulting Word-Level Alignment Sequence: You:HIT, Love to→Like to:SUBS,
Dress up:HIT.

The resulting word-level alignment sequence in the example above can be characterized by alignment regions and potential confusion zones. Specifically, each HIT (matching element) represents an alignment region, and any unit other than HIT, i.e., SUBS, INS, DEL, represents a potential confusion zone. The alignment sequence above can be split into three areas. The first area is an alignment region that includes the word set You in each statement. The second area is a potential confusion zone that includes the word set Like to in the first statement and the word set Love to in the second statement. The third area is an alignment region that includes the word set Dress up in each statement.

The distance between two statements is a function of the way the words in the statements align to each other. Therefore, two identical statements will have a separation distance of zero and the resulting alignment sequence would include only one alignment region. Also, two statements that are far apart will not include any alignment regions and the resulting alignment sequence will include one long potential confusion zone. An optimized grammar should avoid inclusion of close statement paths when possible, and instead should include statements paths that are sufficiently far apart to avoid errors when used for speech recognition.

For speech recognition purposes, two identical word statements cannot cause recognition errors. Being identical, there is no confusion between them. So, the process of determining where recognition errors may occur in the input grammar 401, i.e., the GFE, is not limited to identifying the alignment regions between statements. Rather, the GFE is concerned with determining whether statements in the input grammar 401 are too close but not identical, and if they are too close, determining how likely it is that words in the potential confusion zones between the statements will produce speech recognition errors. Therefore, the phonetic similarity evaluation 409 is performed on the potential confusion zones, as identified between statements in the word-level alignment process 407, to provide a measure of how close the statements are within the potential confusion zone, thereby informing a decision as to whether or not the statements are likely to induce speech recognition errors.

In the phonetic similarity evaluation 409, each potential confusion zone resulting from the word-level alignment process 407 is transformed into phonetic sequences by replacing the words in the potential confusion zone with their corresponding phonetic transcription. For each potential confusion zone, the phonetic similarity evaluation 409 includes: 1) expanding the words of each statement in the potential confusion zone into their corresponding phonemes, 2) determining an optimal alignment of the phonemes between the statements within the potential confusion zone, and 3) based on the optimal alignment of the phonemes, calculating a measure of confusion probability between the words, i.e., phonemes thereof, in the respective statements within the potential confusion zone.

As with the word-level alignment process 407, in one embodiment, the phoneme-level alignment of the phonetic similarity evaluation 409 is implemented as a dynamic programming procedure. In this embodiment, the phoneme-level alignment is driven by a cost of replacing one phoneme of one statement (within the potential confusion zone) with a phoneme from the other statement (within the same potential confusion zone). The phoneme-level alignment determines an "optimal" alignment of phonemes within the potential confusion zone, where the optimal alignment of phonemes corresponds to the lowest total replacement cost in aligning the phonemes within the potential confusion zone.

With reference to the previous example discussed above, consider the potential confusion zone that includes the word set Like to in the first statement and the word set Love to in the second statement. The phoneme expansion of the words in the two statements within the potential confusion zone is as follows:

First statement/First Potential Confusion Zone: l ay k_t uw
Second statement/First Potential Confusion Zone: l ah v_t uw The optimal alignment of the phonemes between the statements within the potential confusion zone is characterized in a resulting phoneme-level alignment sequence as follows:

l:HIT, ah→ay:SUBS, v→k:SUBS, t:HIT, uw:HIT.

In one embodiment, the measure of confusion probability, i.e., distance, between two phonetic alignments is represented as a weighted phonetic alignment accuracy (WPA) value calculated in accordance with Equation 1.

$$WPA = 100 * \frac{\#HIT - \#INS}{\#HIT + \#SUBS + \#DEL} * \left(1 - \frac{\max(l_1, l_2)}{\max(L_1, L_2)}\right). \quad \text{Equation 1}$$

As seen in Equation 1, the weighted phonetic alignment accuracy (WPA) is a measure that is bounded in the upper end to 100 (perfect accuracy means that the phoneme sequences are identical). Also, the lower bound of the weighted phonetic alignment accuracy (WPA) can be negative if the number of phoneme insertions (#INS) is larger than the number of phoneme matches (#HIT).

In Equation 1, $$\left(1 - \frac{\max(l_1, l_2)}{\max(L_1, L_2)}\right)$$

is a scaling factor to weight up or down the weighted phonetic alignment accuracy (WPA) based on the character length of the word sequences where the analysis is made. The parameter $L_1$ refers to the character length of the entire first statement in the analysis. The parameter $L_2$ refers to the character length of the entire second statement in the analysis. The parameter $l_1$ refers to the character length within the potential confusion zone under consideration in the first statement. The parameter $l_2$ refers to the character length within the potential confusion zone under consideration in the second statement. In one embodiment, the character length includes the number of text characters within the words of the statement region and the spaces between words within the statement region. Also, in one embodiment, where the statement expansion process 405 encapsulates each statement in beginning and ending flags, such as _BEGIN_ and _END_) the character length of the entire statement includes the number of text characters within the beginning and ending flags and their respective adjoining spaces in the direction of the statement text.

Because there are always at least two statements involved in the phonetic similarity evaluation 409, the scaling factor is computed using the maximum of the respective character length parameters ($\max(l_1, l_2)$ and $\max(L_1, L_2)$). It should be appreciated that the scaling factor serves to give a weight to the weighted phonetic alignment accuracy (WPA) based on the size of the potential confusion zone relative to the size of the entire statement. The scaling factor increases as the size of the potential confusion zone decreases relative to the size of the statement. Therefore, the weighted phonetic alignment accuracy (WPA) value scales higher as the size of the potential confusion zone decreases relative to the size of the statement. Also, it should be understood that a larger weighted phonetic alignment accuracy (WPA) value corresponds to a higher similarity, i.e., increased closeness/shorter distance, between the statement portions within the potential confusion zone.

With reference to the example discussed above, the phoneme-level alignment sequence (l:HIT, ah→ay:SUBS, v→k:SUBS, t:HIT, uw:HIT) provides the following parameters for the weighted phonetic alignment accuracy (WPA) calculation: #HIT=3, #INS=0, #SUBS=2, #DEL=0, $\max(l_1,l_2)$=7, $\max(L_1,L_2)$=34. The corresponding weighted phonetic alignment accuracy (WPA) is calculated as 47.65.

A thresholding operation over the weighted phonetic alignment accuracy (WPA) values can be performed in order to focus on potential confusion zones that have a higher similarity and corresponding higher likelihood of causing an error during the speech recognition process. The potential confusion zones with weighted phonetic alignment accuracy (WPA) values higher than a pre-defined threshold can be selectively reported as candidates for modification or suppression within the input grammar 401 in order to reduce the overall confusability in the input grammar 401, and correspondingly reduce the risk of speech recognition errors.

In other embodiments, techniques different from that provide by way of Equation 1, may be utilized to evaluate the measure of confusion probability, i.e., distance, between two phonetic alignments within a potential confusion zone. Any different technique, however, should provide a quantitative evaluation of similarity between statement portions within identified potential confusion zones to enable a relative classification of potential confusion zones within a grammar in terms of their likelihood of causing confusion or errors during the speech recognition process.

It should be noted that in a given input grammar 401, potential confusion zones as identified by the word-level alignment process 407 may not be related to a unique pair of statements. In other words, a given potential confusion zone as characterized by its word-level content may appear multiple times across different pairs of statements within the input grammar 401. Therefore, the word-level alignment of different statements in the input grammar 401 may yield the same potential confusion zones and, consequently, the same phonetic alignments. The analysis of identical potential confusion zones does not need to be repeated. Rather, the weighted phonetic alignment accuracy (WPA) values for these recurring potential confusion zones can be stored and simply retrieved each time the potential confusion zone recurs across any pair of statements within the input grammar 401.

It should be understood that just because words are similar, does not necessarily mean that the words will cause confusion during the speech recognition process. The similar words may cause confusion if they appear in similar contexts or in the same branching point within the input grammar 401. However, if the similar words appear in sufficiently different context or at different branching points within the input grammar 401, the similar words may not cause any confusion during the speech recognition process. For example, consider the following two statements:

First statement: _BEGIN_ Boy, I am a smart robot _END_
Second statement: _BEGIN_ I am a smart toy _END_
Resulting Word-Level Alignment Sequence: Boy,:DEL, I:HIT, am:HIT, a:HIT,
smart:HIT, robot→toy:SUBS.

In this example, the words Boy and toy are similar, but will not cause confusion because they appear in different context and do not appear at the same branch point in the grammar. In this example, there are two potential confusion zones, one at the beginning of the alignment sequence, and one at the end of the alignment sequence. From this result, it follows that the comparison at the phonetic level should be done between robot and toy because they appear in similar context and they share a common stem in the grammar.

As described above, in one embodiment, the phonetic similarity evaluation 409 can be performed based on whether or not phonemes within the different statements within the potential confusion zone are identical or different. In another embodiment, the phonetic similarity evaluation 409 can consider more information regarding the nature of the compared phonemes. For example, the potential confusion between phonemes /m/ and /n/ can be given a higher weight than the potential confusion between /m/ and /i/. The higher weight may be assigned to more frequently confused phonemes, such as similar sounding phonemes that may be a sole differentiator between two words. For example, consider the phonemes /m/ and /n/ in the pair of words "norm" and "morn."

With reference back to FIG. 4, a phonetic distance matrix 411 can be provided as an input resource for performing the phonetic similarity evaluation 409. In one embodiment, the phonetic distance matrix 411 is based on confusion matrices (post-recognition distance measures) or based on relative distances between the acoustic models of each phoneme (pre-recognition distance measures). The content of the confusion matrix is dependent on the data and recognition settings that were used to do live speech recognition testing. A phoneme distance measure based on acoustic models is computed prior to live speech recognition and represents an alternative to a symbol-based phoneme comparison to enable further refinement of the considered phonetic distance between words.

Figure 5:
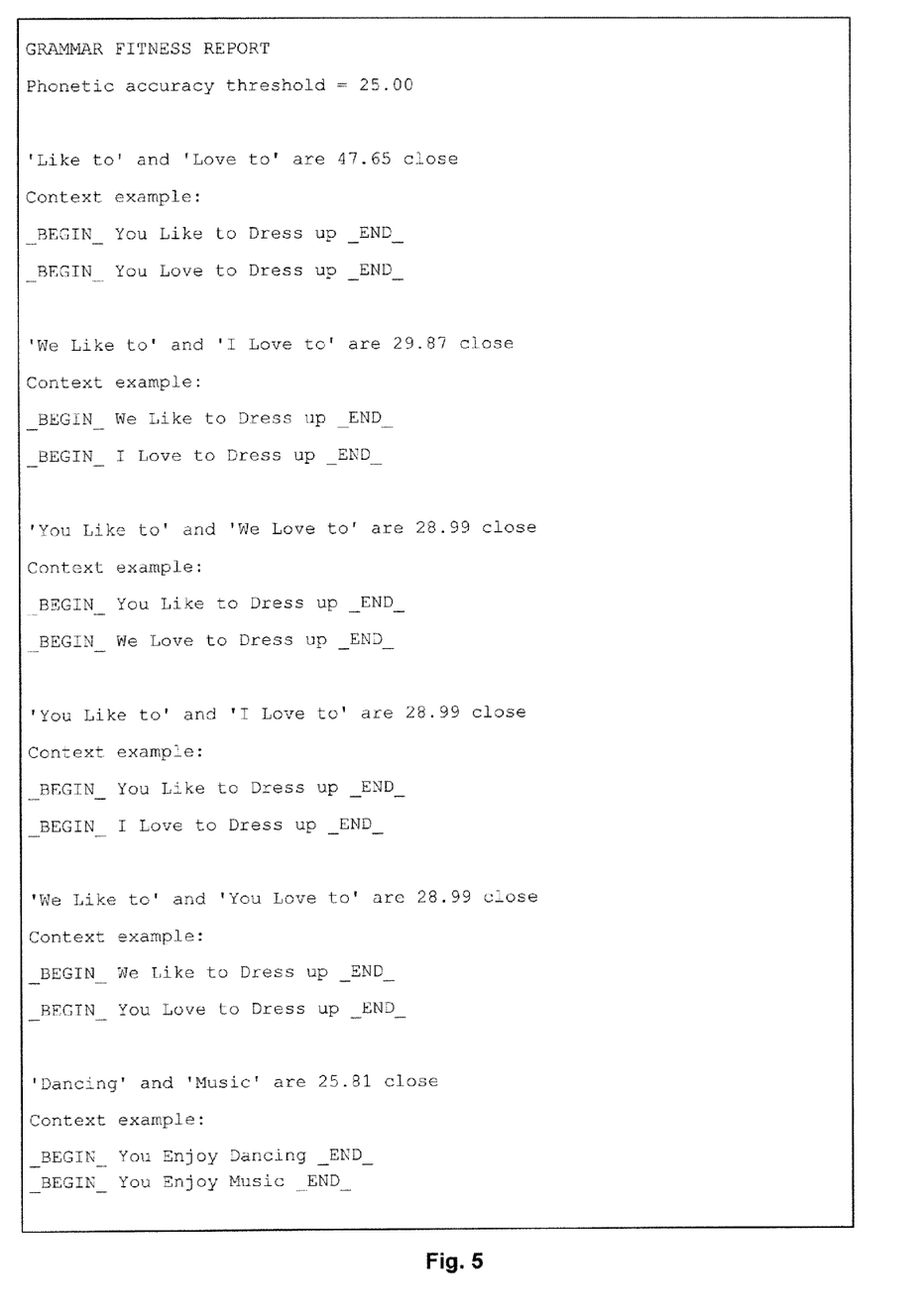
FIG. 5 shows an example excerpt from a grammar fitness report generated by performing the GFE on the example input grammar of FIG. 2, in accordance with one embodiment of the present invention.

Further with regard to FIG. 4, the results of the GFE can be conveyed in a grammar fitness report 413. The grammar fitness report 413 can be formatted to convey an identity of the potential confusion zones across the statements of the input grammar 401 and their corresponding measure of confusion probability, i.e., their calculated weighted phonetic alignment accuracy (WPA) values. The identification of potential confusion zones in the grammar fitness report 413 can be sorted in terms of weighted phonetic alignment accuracy (WPA). FIG. 5 shows an example excerpt from a grammar fitness report generated by performing the GFE on the example input grammar of FIG. 2, in accordance with one embodiment of the present invention. In the grammar fitness report there may be several words flagged as prone to cause recognition errors because all those words are part of a word set within a potential confusion zone, such as in the case of the first pair Like to vs Love to in FIG. 5.

A higher weighted phonetic alignment accuracy (WPA) value can mean that the pronunciations for the words in the corresponding potential confusion zone are very close to each other, although they may be different words, and this may indicate a likely speech recognition error. For this reason, the potential confusion zones having higher weighted phonetic accuracy (WPA) values are listed first in the grammar fitness report 413. The context of the potential confusion zones is also included in the grammar fitness report 413 to enable a reviewer of the grammar fitness report 413 to more easily locate the source of potential speech recognition errors in the grammar.

The grammar fitness results generated by the grammar fitness evaluation (GFE) disclosed herein can be used to modify the speech recognition grammar in order to reduce speech recognition errors. In one embodiment, the grammar fitness results can be used to correct the grammar automatically, without the supervision of the grammar developer. In another embodiment, the grammar fitness results are used to manually correct the grammar. More specifically, with reference to FIG. 4, the grammar fitness report 413 is provided for use in either a manual or automatic correction process 415 of the input grammar 401. Based on the grammar fitness report 413, the manual or automatic correction process 415 generates an optimized version of the grammar 417, in which confusing portions of the statements within the input grammar 401 are eliminated or suppressed.

It should be understood and appreciated that the grammar fitness evaluation described herein is performed without the use of any speech signal (digital data representing audible sound/speech). It should also be understood and appreciated that the grammar fitness evaluation described herein is performed based on the structure of the grammar. The aforementioned points are advantageous in that the grammar fitness evaluation allows the process of grammar edition and correction to be moved closer to the grammar generation process, without the need for actual speech recognition experimentation. It should be further understood that the grammar fitness evaluation can be used as a feedback mechanism in the process to generate a GnD file.

Figure 6:
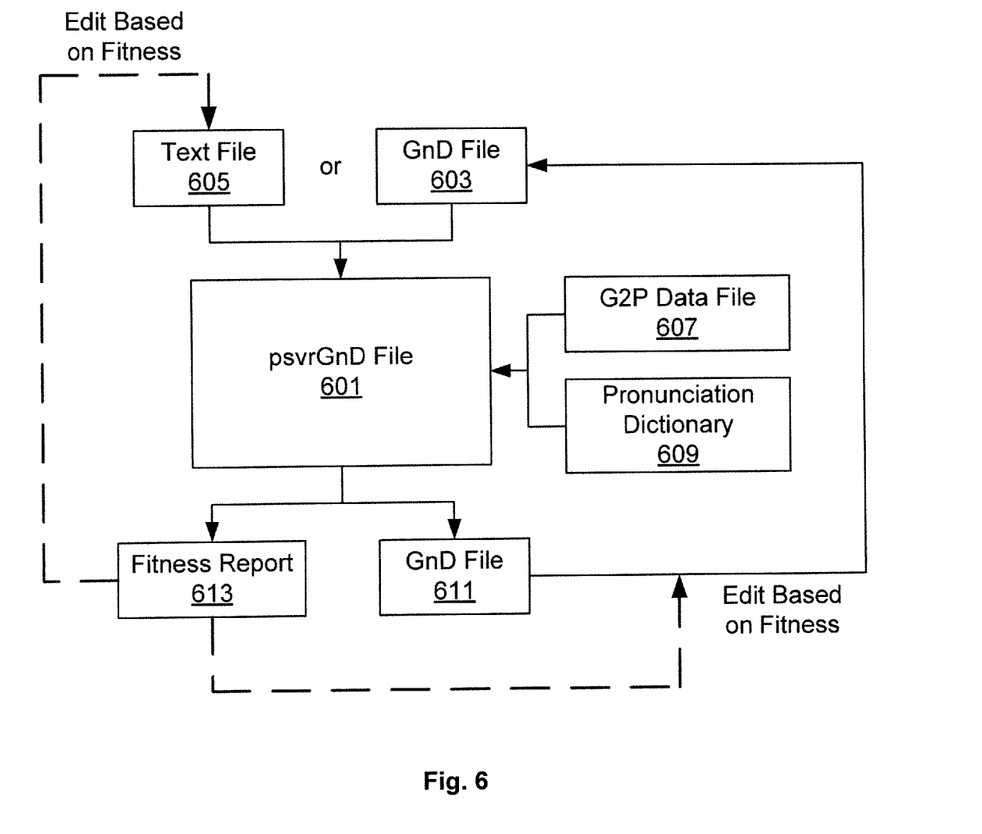
FIG. 6 shows a process flowchart for the construction of a GnD file and the corresponding grammar fitness evaluation thereof, in accordance with one embodiment of the present invention.

FIG. 6 shows a process flowchart for the construction of a GnD file and the corresponding grammar fitness evaluation thereof, in accordance with one embodiment of the present invention. The process can be started by supplying either plain text file 605 (e.g., FIGS. 1A-1B) or a GnD file 603 (e.g., FIG. 2) as input to a grammar construction/evaluation tool, represented as a psvrGnD executable file 601. Each of the plain text file 605 and GnD file 603 is defined to specify the statements within the grammar.

Auxiliary files are provided to the grammar construction/evaluation tool 601 to support pronunciation generation. Specifically, one or more grapheme-to-phoneme (G2P) data files 607 are provided to the grammar construction/evaluation tool 601. The G2P data files 607 match graphemes (characters) of words with the phonemes of their pronunciations. This enables the grammar construction/evaluation tool 601 to generate pronunciations for words based on their spelling. Also, one or more pronunciation dictionaries 609 are provided to the grammar construction/evaluation tool 601. The pronunciation dictionary 609 includes pronunciations for a specific set of words, such as commonly used words that are difficult to process using the G2P data files 607.

The grammar construction/evaluation tool 601 performs grammar generation by automatically extracting from text samples the relationships among the words that construct statements. The grammar construction/evaluation tool 601 can take as input either plain text statements or statements formatted in a special way that allows synthetic representation of sentences through variable declarations and word alternatives. The grammar construction/evaluation tool 601 can also perform pronunciation generation using either a lookup in the pronunciation dictionary 609 or by performing a grapheme-to-phoneme conversion using the G2P data file 607. In the G2P conversion process, the grammar construction/evaluation tool 601 takes as input a word and automatically generates its pronunciation in a target language.

After the grammar and pronunciation generation is completed, the grammar construction/evaluation tool 601 compiles both the grammar and pronunciation together and formats the results into a GnD file 611. This output can also include other information such as transition probabilities and language identifiers. The grammar construction/evaluation tool 601 is also defined to perform the grammar fitness evaluation described above with regard to FIG. 4. The results of the grammar fitness evaluation are written to a fitness report 613. The information within the fitness report 613 can be used to edit/refine either the originally input text file 605, or the newly generated GnD file 611. Then, the process can be repeated to see if the edits/refinements have improved the fitness of the grammar. The process can be iteratively run until the grammar and dictionary is suitable for use in a speech recognition process.

Figure 7:
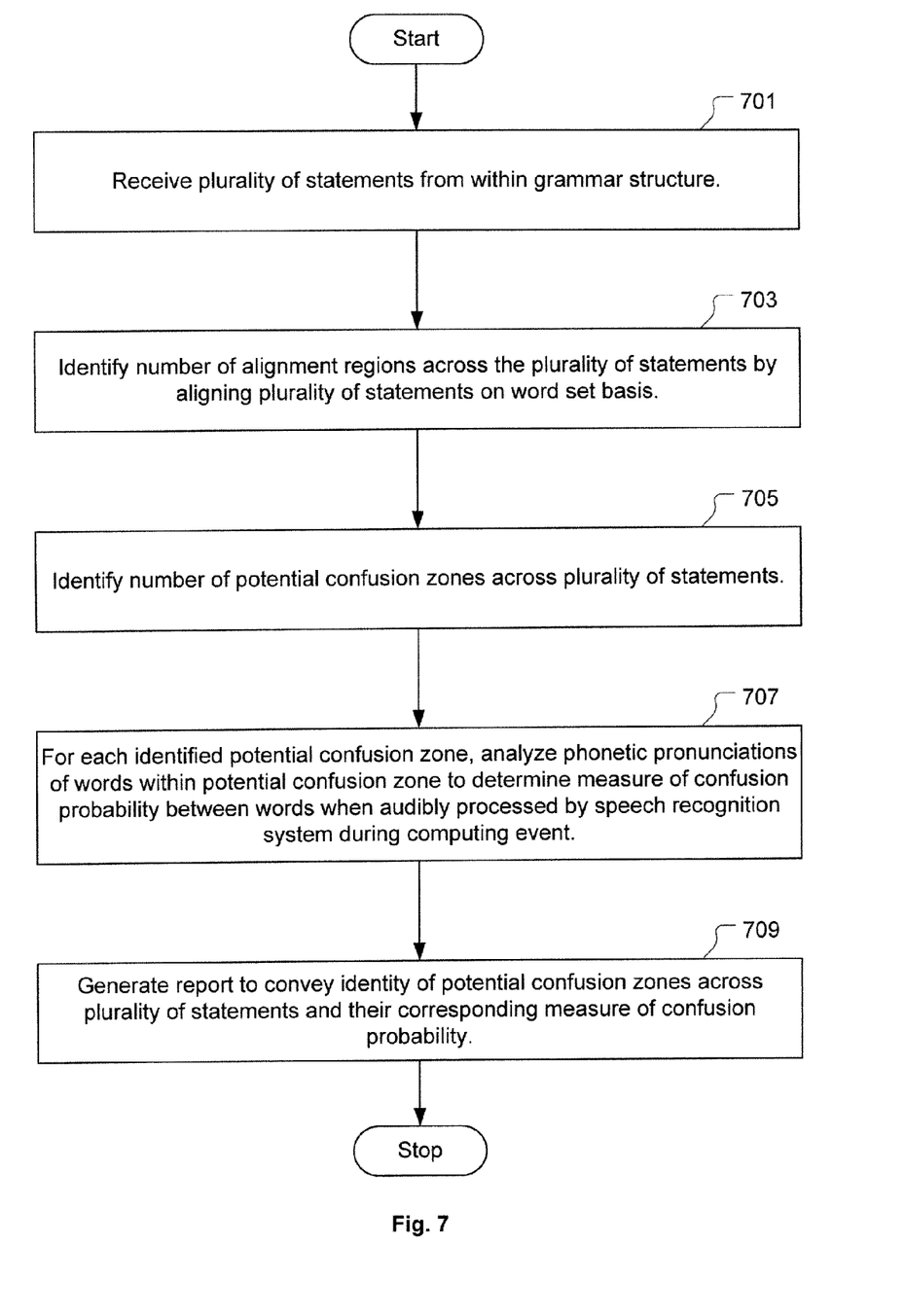
FIG. 7 shows a flowchart of a computer implemented method for evaluating potential confusion within a grammar structure for a set of statements to be used in speech recognition during a computing event, in accordance with one embodiment of the present invention.

FIG. 7 shows a flowchart of a computer implemented method for evaluating potential confusion within a grammar structure for a set of statements to be used in speech recognition during a computing event, in accordance with one embodiment of the present invention. The method includes an operation 701 for receiving a plurality of statements from within a grammar structure. Each of the plurality of statements is formed by a number of word sets. Each word set can include one or more words. The method also includes an operation 703 for identifying a number of alignment regions across the plurality of statements by aligning the plurality of statements on a word set basis. Each aligned word set represents an alignment region. In one embodiment, operation 703 includes deter wining a best overall alignment of identical word sets across the plurality of statements.

In one embodiment, a processing of the plurality of statements within the computer-implemented method is terminated when the number of alignment regions identified across the plurality of statements is zero. Also, in one embodiment, a processing of the plurality of statements within the computer-implemented method is terminated when the plurality of statements are identical to each other.

The method further includes an operation 705 for identifying a number of potential confusion zones across the plurality of statements. Each potential confusion zone is defined by words from two or more of the plurality of statements at corresponding positions outside the number of alignment regions. For each of the identified potential confusion zones, an operation 707 is performed to analyze phonetic pronunciations of the words within the potential confusion zone to determine a measure of confusion probability between the words when audibly processed by a speech recognition system during the computing event.

In one embodiment, operation 707 includes performing a phoneme-level alignment across phonemes of the words of the plurality of statements within the potential confusion zone. A phoneme is a minimal distinct unit of a sound system of a language. In one instance, performing the phoneme-level alignment includes determining the best overall alignment of identical phonemes of the words within the potential confusion zone across the plurality of statements. Also, in this embodiment, operation 707 includes computing a phonetic accuracy value for the potential confusion zone based on the phoneme-level alignment. The phonetic accuracy value corresponds to the measure of confusion probability between the words of the plurality of statements within the potential confusion zone when audibly processed by the speech recognition system during the computing event.

The method also includes an operation 709 for generating a report to convey an identity of the potential confusion zones across the plurality of statements and their corresponding measure of confusion probability. In one embodiment, a confusion probability threshold value is applied when generating the report, such that only potential confusion zones whose measure of confusion probability is greater than or equal to the confusion probability threshold value are identified in the report. It should be understood that the computer implemented method of FIG. 7 is performed without auditory input.

Figure 8:
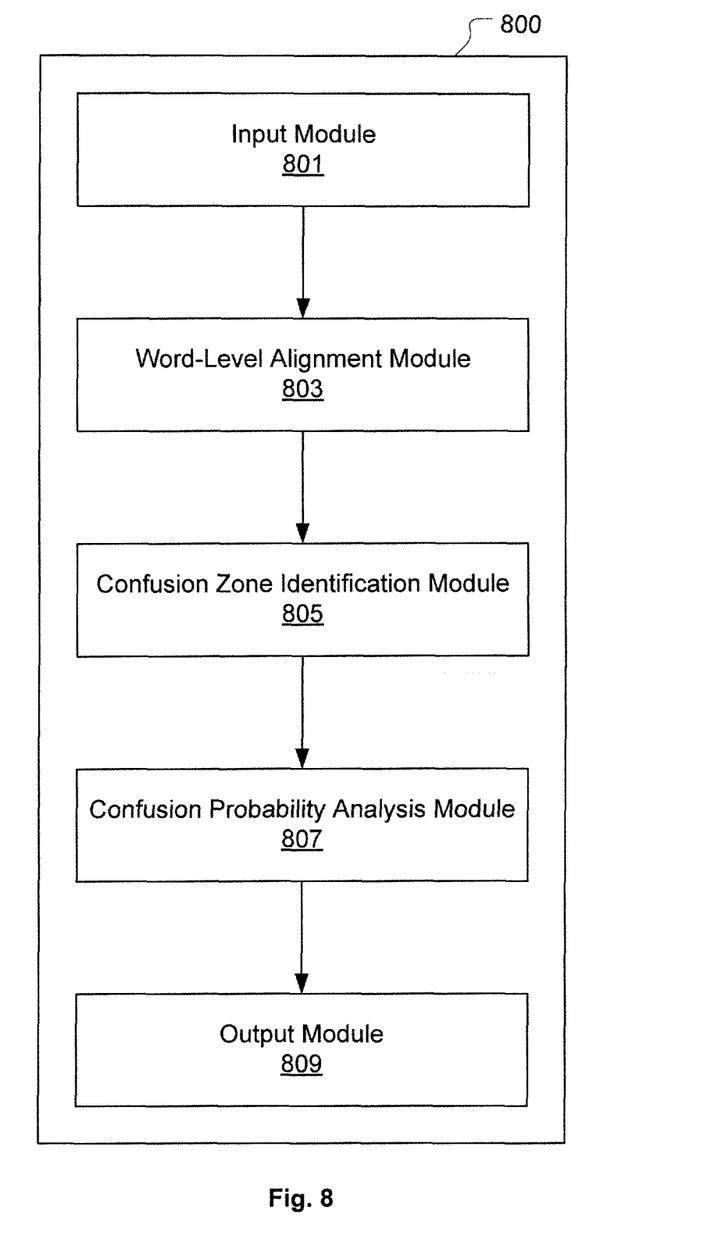
FIG. 8 shows a block diagram of a system for evaluating potential confusion within a grammar structure for a set of statements to be used in speech recognition during a computing event, in accordance with one embodiment of the present invention.

FIG. 8 shows a block diagram of a system 800 for evaluating potential confusion within a grammar structure for a set of statements to be used in speech recognition during a computing event, in accordance with one embodiment of the present invention. The system 800 includes an input module 801 defined to receive a plurality of statements from within a grammar structure. Each of the plurality of statements is formed by a number of word sets. Each word set includes one or more words.

The system 800 also includes a word-level alignment module 803 defined to identify a number of alignment regions across the plurality of statements received by the input module 801. An alignment region corresponds to identical word sets aligned across the plurality of statements. In one embodiment, the word-level alignment module 803 is defined to determine a best overall alignment of identical word sets across the plurality of statements.

The system 800 also includes a confusion zone identification module 805 defined to identify a number of potential confusion zones across the plurality of statements. Each potential confusion zone is defined by words from two or more of the plurality of statements at corresponding positions outside the number of alignment regions identified by the word-level alignment module 803.

The system 800 also includes a confusion probability analysis module 807 defined to analyze phonetic pronunciations of the words within a given potential confusion zone identified by the confusion zone identification module 805, to determine a measure of confusion probability between the words within the given potential confusion zone when audibly processed by a speech recognition system during the computing event. In one embodiment, the confusion probability analysis module 807 is defined to perform a phoneme-level alignment across phonemes of the words of the plurality of statements within the given potential confusion zone. In one instance of this embodiment, the confusion probability analysis module 807 is defined to determine the best overall alignment of identical phonemes of the words within the given potential confusion zone across the plurality of statements when performing the phoneme-level alignment.

Also, in this embodiment, the confusion probability analysis module 807 is defined to compute a phonetic accuracy value based on the phoneme-level alignment. The phonetic accuracy value corresponds to the measure of confusion probability between the words within the given potential confusion zone when audibly processed by the speech recognition system during the computing event.

The system 800 also includes an output module 809 defined to generate a report to convey an identity of the potential confusion zones across the plurality of statements and their corresponding measure of confusion probability. In one embodiment, the output module 809 is defined to apply a confusion probability threshold value to generate the report, such that only potential confusion zones whose measure of confusion probability is greater than or equal to the confusion probability threshold value are identified in the report.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
    performing a word-level alignment process between a pair of statements to generate a word-level alignment sequence for the pair of statements, each statement in the pair of statements including one or more words that articulate a message for a computer application upon recognition by a speech recognition system;
    identifying each potential confusion zone within the word-level alignment sequence generated for the pair of statements; and
    determining a probability of the speech recognition system confusing words within each identified potential confusion zone within the word-level alignment sequence generated for the pair of statements,
    wherein the operations of the method are performed by a computer processor.

2. The method as recited in claim 1, wherein the word-level alignment sequence is characterized in units of a matching element, a substitution element, an insertion element, and a deletion element.

3. The method as recited in claim 2, wherein each matching element corresponds to one or more words in a first statement identical to one or more words in a second statement, the first and second statements composing the pair of statements,
    wherein each substitution element corresponds to one or more words in the first statement substituted with one or more different words in the second statement,
    wherein each insertion element corresponds to one or more words in the second statement not present in the first statement, and
    wherein each deletion element corresponds to one or more words in the first statement not present in the second statement.

4. The method as recited in claim 3, wherein performing the word-level alignment process between the pair of statements includes maximizing a number of the matching element and minimizing a combined number of the substitution, insertion, and deletion elements.

5. The method as recited in claim 3, wherein identifying each potential confusion zone within the word-level alignment sequence includes identifying each substitution element, insertion element, and deletion element as a respective potential confusion zone.

6. The method as recited in claim 5, wherein determining the probability of the speech recognition system confusing words within a given potential confusion zone includes performing a phoneme-level alignment across phonemes of the one or more words of each of the pair of statements within the given potential confusion zone, and computing a phonetic accuracy value for the given potential confusion zone based on the phoneme-level alignment.

7. The method as recited in claim 6, wherein a phoneme is a minimal distinct unit of a sound system of a language.

8. The method as recited in claim 6, wherein performing the phoneme-level alignment includes determining a best overall alignment of identical phonemes of the one or more words of the first statement within the given potential confusion zone with the one or more words of the second statement within the given potential confusion zone.

9. The method as recited in claim 8, wherein the best overall alignment of identical phonemes corresponds to a maximum number of aligned identical phonemes between the one or more words of the first statement within the given potential confusion zone and the one or more words of the second statement within the given potential confusion zone.

10. The method as recited in claim 6, wherein the phonetic accuracy value corresponds to a measure of confusion probability between the one or more words of the first statement within the given potential confusion zone and the one or more words of the second statement within the given potential confusion zone when audibly processed by the speech recognition system.

11. The method as recited in claim 10, further comprising:
    comparing the phonetic accuracy value for the given potential confusion zone to a confusion probability threshold value to determine whether or not the probability of the speech recognition system confusing words within the given potential confusion zone is of concern; and reporting the given potential confusion zone as of concern when the phonetic accuracy value for the given potential confusion zone is greater than or equal to the confusion probability threshold value.

12. The method as recited in claim 11, further comprising:
applying the method to a plurality of statements defined for speech recognition by the speech recognition system for the computer application, such that each different combination of two statements within the plurality of statements is processed as the pair of statements within the method.

13. The method as recited in claim 12, wherein the method is performed without auditory input.

14. The method as recited in claim 1, wherein the method is performed without auditory input.

15. A non-transitory data storage device having program instructions stored thereon for a system for grammar fitness evaluation, comprising:
program instructions for a word-level alignment module defined to perform a word-level alignment process between a pair of statements to generate a word-level alignment sequence for the pair of statements, each statement in the pair of statements including one or more words that articulate a message for a computer application upon recognition by a speech recognition system;
program instructions for a confusion zone identification module defined to identify each potential confusion zone within the word-level alignment sequence generated for the pair of statements; and
program instructions for a confusion probability analysis module defined to determine a probability of the speech recognition system confusing words within each identified potential confusion zone within the word-level alignment sequence generated for the pair of statements.

16. The non-transitory data storage device as recited in claim 15, wherein the word-level alignment sequence is characterized in units of a matching element, a substitution element, an insertion element, and a deletion element,
each matching element corresponding to one or more words in a first statement identical to one or more words in a second statement, the first and second statements composing the pair of statements,
each substitution element corresponding to one or more words in the first statement substituted with one or more different words in the second statement,
each insertion element corresponding to one or more words in the second statement not present in the first statement, and
each deletion element corresponding to one or more words in the first statement not present in the second statement.

17. The non-transitory data storage device as recited in claim 16, wherein the confusion zone identification module is defined to identify each substitution element, insertion element, and deletion element as a respective potential confusion zone within the word-level alignment sequence.

18. The non-transitory data storage device as recited in claim 17, wherein the confusion probability analysis module is defined to perform a phoneme-level alignment across phonemes of the one or more words of each of the pair of statements within the given potential confusion zone, and based on the phoneme-level alignment determine a confusion probability between the one or more words of the first statement within the given potential confusion zone and the one or more words of the second statement within the given potential confusion zone.

19. The non-transitory data storage device as recited in claim 18, wherein the confusion probability analysis module is defined to perform the phoneme-level alignment process by determining a best overall alignment of identical phonemes of the one or more words of the first statement within the given potential confusion zone with the one or more words of the second statement within the given potential confusion zone,
wherein the confusion probability analysis module is defined to compute a phonetic accuracy value for the given potential confusion zone based on the determined confusion probability, and
wherein the confusion probability analysis module is defined to compare the phonetic accuracy value for the given potential confusion zone to a confusion probability threshold value to determine whether or not the probability of the speech recognition system confusing words within the given potential confusion zone is of concern.

20. The non-transitory data storage device as recited in claim 19, further comprising:
program instructions for an output module defined to report the given potential confusion zone as of concern when the phonetic accuracy value for the given potential confusion zone is greater than or equal to the confusion probability threshold value.

* * * * *